(12) United States Patent
Wolf

(10) Patent No.: US 8,504,926 B2
(45) Date of Patent: Aug. 6, 2013

(54) MODEL BASED AVATARS FOR VIRTUAL PRESENCE

(75) Inventor: Heiner Wolf, Hamburg (DE)

(73) Assignee: Lupus Labs UG, Hamburg (DE)

( * ) Notice: Subject to any disclaimer, the term of this patent is extended or adjusted under 35 U.S.C. 154(b) by 782 days.

(21) Appl. No.: 12/009,082

(22) Filed: Jan. 16, 2008

(65) Prior Publication Data

US 2008/0215995 A1    Sep. 4, 2008

Related U.S. Application Data

(60) Provisional application No. 60/880,761, filed on Jan. 17, 2007.

(51) Int. Cl.
*G06F 3/048* (2006.01)
*G06F 15/16* (2006.01)

(52) U.S. Cl.
USPC .............................. 715/751; 715/753; 715/758

(58) Field of Classification Search
USPC ......................................... 715/848, 751–759
See application file for complete search history.

(56) References Cited

U.S. PATENT DOCUMENTS

| | | | |
|---|---|---|---|
| 5,819,084 A | 10/1998 | Shapiro et al. | |
| 5,864,874 A | 1/1999 | Shapiro | |
| 5,894,307 A * | 4/1999 | Ohno et al. | 715/757 |
| 6,057,856 A * | 5/2000 | Miyashita et al. | 345/633 |
| 6,175,842 B1 * | 1/2001 | Kirk et al. | 715/205 |
| 6,243,714 B1 | 6/2001 | Shapiro et al. | |
| 6,329,994 B1 * | 12/2001 | Gever et al. | 345/473 |
| 6,442,590 B1 * | 8/2002 | Inala et al. | 709/204 |
| 6,466,213 B2 * | 10/2002 | Bickmore et al. | 345/473 |
| 6,480,837 B1 * | 11/2002 | Dutta | 1/1 |
| 6,651,050 B2 | 11/2003 | Shafrir et al. | |
| 6,784,901 B1 * | 8/2004 | Harvey et al. | 715/757 |
| 6,954,902 B2 * | 10/2005 | Noma et al. | 715/753 |
| 7,958,453 B1 * | 6/2011 | Taing | 715/744 |
| 2001/0019337 A1 * | 9/2001 | Kim | 345/757 |
| 2004/0135820 A1 * | 7/2004 | Deaton et al. | 345/848 |
| 2005/0253840 A1 * | 11/2005 | Kwon | 345/419 |
| 2006/0161446 A1 | 7/2006 | Fyfe et al. | |
| 2006/0294465 A1 * | 12/2006 | Ronen et al. | 715/706 |
| 2008/0214214 A1 * | 9/2008 | Reissmueller et al. | 455/466 |

FOREIGN PATENT DOCUMENTS

DE    10 2004 061 884    7/2006

OTHER PUBLICATIONS

European Search Report dated May 4, 2009.
Heiner Wolf: "Distributed virtual presence systems for the web" Proc. of Iadis Intl. Conf. Web Based Community, Feb. 26, 2006-Feb. 28, 2006, pp. 97-104. XP002523858. (European SR).
Henrik Pfeiffer: "Mein Browser lebt" JETZT.DE [online] Nov. 6, 2006, XP002523791, URL: http://jetzt.sueddeutsche.de/texte/anzeigen/346053, pp. 1-5. (European SR).
Palfreyman, K. et al.: "A Protocol for User Awareness on the World Wide Web" [ACM Conference on Computer Supported Cooperative Work], Nov. 16, 1996, pp. 130-139, XP000724418. (European SR).
Henri ter Hofte, G. et al.: "Close encounters of the virtual kind: a study on place-based presence" AI & Society; The Journal of Human-centred Systems, Springer-Verlag, LO, vol. 20, No. 2, Mar. 1, 2006, pp. 151-168, XP019380083. (European SR).

* cited by examiner

*Primary Examiner* — Tadeese Hailu
(74) *Attorney, Agent, or Firm* — Collard & Roe, P.C.

(57) ABSTRACT

An image generating system for simultaneous visual representative display of multiple computer users is disclosed. The method and apparatus includes hardware, software, and a system for generating various images for one or more users of a connected computer system, and imposing them onto the systems and ultimately the visual display of each user's system. The images, which may be known as avatars, may be static images, animated 2D, and/or animated 3D images. The images are simultaneously displayed on the outputs of each user. Each user may react and interact with the images of the other users through their own image.

21 Claims, 19 Drawing Sheets

MODEL BASED AVATARS FOR VIRTUAL PRESENCE

This application claims the benefit of U.S. Provisional Application 60/880,761 filed 17 Jan. 2007.

FIELD OF THE INVENTION

The present invention relates to a system for creating computer generated images in general, and to a system for creating computer generated images which may interact with simultaneously generated images of other remote users in particular.

BACKGROUND OF THE INVENTION

Virtual presence is a technology which makes people on Web pages aware of each other. Web users who are visiting the same Web site/page at the same time are made aware of each other. In general, users see a representation of other people who are at the same Web page at the same time. In practice users who access a Web page see—in addition to the content of the page—a list of other user's. In the past, this may be a textual list. Before the present invention, it was state of the art to provide lists of names in a separate window, without graphical figures (avatars), and not on the browser window. The old systems detracted from the overall visual element if the rest of the software.

SUMMARY OF THE PRESENT INVENTION

According to the present invention, the simultaneous users may be represented as one or even a collection of animated avatar figures. Users can interact and communicate (in practice: chat and VoIP).

The general principle is called Web Awareness (because it makes people aware of each other on Web pages) or Virtual Presence (because they are virtually present at Web pages).

A user opens a Web browser and navigates to a URL. The Web browser shows the content of the page. A Virtual Presence client software generates or retrieves a list of other users who access the same Web site/page. The Virtual Presence client software also retrieves additional information for each user such as an image. The image is displayed on the page, full or partially inside the Web browser window. The image is called an avatar. Avatars of different users may occupy different positions on the page, dispersed in 1 dimension or in 2 dimensions of the page. The position of an avatar can be controlled by the user. In other words: there are small figures standing on the browser and they can move over the page, in x/y direction or just at the lower border left and right.

Avatars can be static images, animated 2D images, or they may be based on 3D models rendered to the screen. 2D avatars are displayed using images stored and transmitted in various image formats. 3D avatars are displayed using 3D models. Both types may be animated. They may show animations automatically, in response to user actions, or on request by the user. Examples for animations are moving lips when the user communicates (chat), walking animations when the avatar moves from left to right, or so called idle moves, which are played automatically from time to time to show that the avatar is 'alive'. Users can also request actions, like a dance move. Animations may also result from interaction of the user (through the avatar) with other users or virtual objects.

The (animated) graphics is generated using 3D model data, textures, motion data and other information, which defines the appearance and behavior of the avatar. This information may include additional objects attached to the avatar, so called virtual items or other equipment (e.g. a poster for a virtual rally). The method of displaying avatars with equipment is well known from 3D games, but it has not been applied to Virtual Presence or Web Awareness to represent users on Web sites/pages (here called VP avatars).

Users may change the appearance including the equipment. They may make these changes directly by modifying the VP avatar using an appropriate user interface software.

Avatars may also be imported from other virtual environments in the sense that they appear similar in the source environment and on the Web page. Imported avatars may be modified indirectly by changing parameters using an external user interface software of another virtual environment. The change will then be reflected by the avatar on the Web page.

To display animated avatars on a Web page as a visualization of users who are accessing a Web site/page and are co-present.

To display avatars as component based avatars based on 2D graphics on a Web page as a visualization of users who are accessing a Web site/page, where the graphics consists of more than one component and where components can be exchanged to visualize carried items, equipment, clothing, etc.

To display avatars based on 3D models on a Web page as a visualization of users who are accessing a Web site/page, where the 3D model may comprise multiple sub-models to visualize carried items, equipment, clothing, etc.

To let users modify the appearance of an animated avatar by changing parameters, adding or removing graphics components, or adding or removing sub-models (meaning: the avatar can wear a hat, trousers, a sword, poster sign for an online rally, etc.)

To synchronize the appearance of an VP avatar with the appearance of an avatar from another virtual space in the sense that they look similar, either by re-creating and rendering a similar model or graphics or by rendering the avatar by means of an external graphics engine. (This means effectively, that the VP avatar on the Web page is the same as the avatar if players of online games. In other words: players of online games can use their avatar on Web pages.)

To let VP avatars on a Web page interact with each other visibly by displaying an animation sequence, which represents the interaction. (This means that avatars may cooperate or compete, including fighting as in online game worlds.)

To let a VP avatar on a Web page interact with a virtual object by displaying an animation sequence, which represents the interaction.

To let a VP avatar interact with the content of the Web page using a communication channel between the Virtual Presence display software and the Web browser software. The Web browser may change the display as a result of the communication. For example, the avatar could take a seat on a chair displayed on the web page or, that the avatar opens a door goes through it and the Web browser navigates to a new page.

To use a data protocol independent of the chat protocol to retrieve avatar data, image, model, or other data which is directly or indirectly used to display avatars. Specifically to use the HTTP protocol to get access to avatar data.

To buy/sell/trade with real or virtual money, items, equipment, clothing, behavior for VP avatars.

The term 'Web site/page' is a subset of the term a 'data resource'. By 'on a Web page' we mean to display avatars spatially associated with the visual representation of data resources (in practice Web pages, whatever encoding format), so that the Web page (the Web browser window) appears as the background of the set of avatars. This is currently interesting for usual 2 dimensional HTML/PDF/DOC, etc. based Web pages, but may also apply to other representations, be it on 3 dimensional desktop environments. The colloquial term 'on a Web page' may describe it best. The present invention sets out for the first time a method for the display of co-presence as avatars on web pages. The most important point in displaying co-presence as avatars is the synchronization of screen coordinates so, that it appears that avatar figures are associated with the Web browser window. The mechanism for showing co-presence as avatars is here for the first time described.

There is some component, which determines or finds out the coordinates of Web browser window(s). This component may be called "window manager". Different ways are used to determine the window coordinates. The window manager can be a module of the Web browser (so called "browser extension") or part of a separate program. If it is a browser extension, then it can find out the so called "window handle" of the browser window. If it is an external program, then it can "observe" the browser window to determine the coordinates or the window handle. If the window manager is part of the Web browser program, then it can get the window handle easily. However the window manager gets the window handle, it can get the coordinates of the window by asking the operating system.

Once the coordinates are known, the avatar figures of the co-presence display can be drawn in the same place, so that they appear "on" the window. Coordinates of the avatars and the browser window are synchronized so, that the avatars seem to "stand" on the lower border of the window. This is done by assigning the avatars a Y-coordinate which is very similar to the browser window's lower border and an X-coordinate equal or larger than the bottom left corner. But the avatars could also be put inside the browser window by adding/subtracting the distance by which they should be elevated compared to the lower border.

DETAILED DESCRIPTION OF PREFERRED EMBODIMENTS

Figure 1:
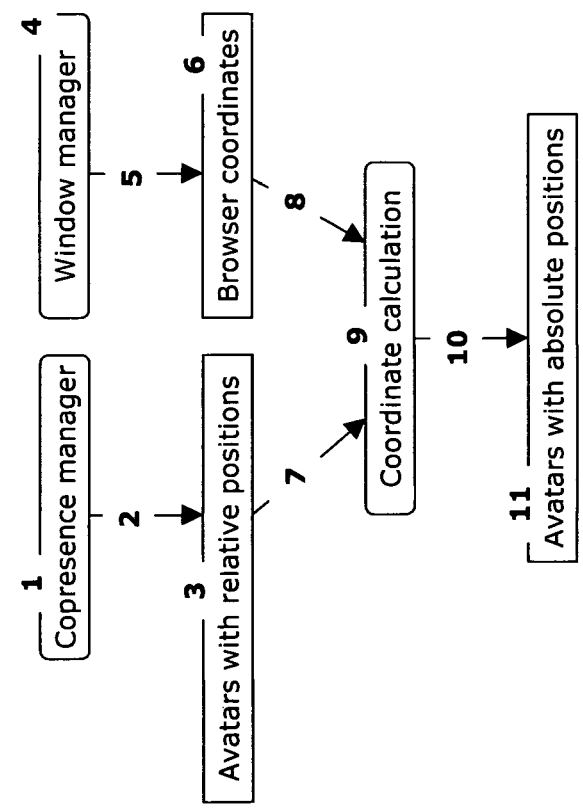
FIG. 1 is a flowchart showing avatar positioning

In FIG. 1: A co-presence manager (1) learns (2) by means of various protocols and interaction with other components which avatars will have to be drawn at coordinates relative to the browser window (3). The window manager (4) finds out (5) about the absolute coordinate (6) of a Web browser window. Both sets of coordinates (7, 8) are fed into the application code (9) which adds (10) the coordinates so that relative avatar coordinates turn into absolute coordinates, which define positions on the screen (11). Then avatars are painted to the screen.

Certain offsets may also be applied (during 10) to account for the width of window borders or arbitrary offsets, for example to make avatars appear "a bit more left".

If a company is a Web browser developer, then they might more deeply integrate the window manager with the Web browser code. They may deny, that they "find out about the window coordinates" or "add relative to absolute coordinates", because they might use a OS built-in mechanism called "child windows". Coordinates of child windows may be automatically relative to the parent window. If avatars are implemented as child windows of the Web browser window, then adding relative (child window) and absolute (browser window) coordinates is done implicitly by the OS. If they use the child window mechanism, then they do partially, because of this feature.

Adding relative and absolute positions to make avatars appear on Web browsers is one of the elements of the present invention.

Before the present invention, it was state of the art to provide lists of names in a separate window, no avatars, and not on the browser window. The old systems detracted from the overall visual element of the rest of the software.

The process above dealt only with positions of avatars, but not with the generation of the graphical images. In one embodiment, the image for each avatar, is painted to the screen from multiple components. In the presently-disclosed component-based 2-D avatars, the avatar image is compiled from various images (or animations). Each component has its purpose, such as a small additional graphic, which indicates an online state (meaning: if a user goes offline it might still be visible on the page, but may have an icon attached, which indicates the offline state). Or a skateboard might be painted permanently left to my avatar to indicate a skateboarder in real life. Clothes, e.g. trousers and shirt, may also be exchanged.

The invention discloses the compilation of images from components to create the co-presence of avatars on Web pages.

Figure 2:
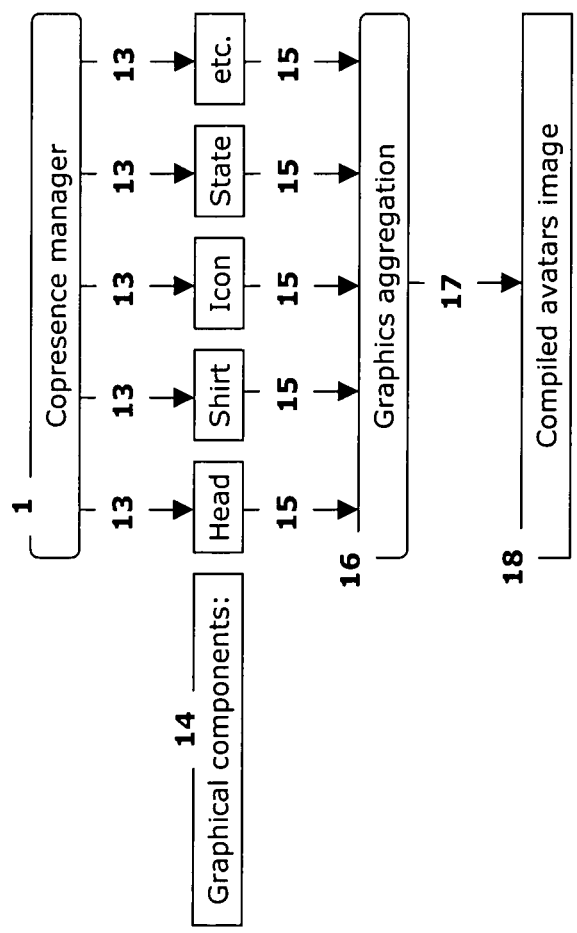
FIG. 2 is a flowchart showing compilation of avatars

In FIG. 2: The Co-presence manager (1) knows which avatars need which component images (animations). It acquires (13) the components (14) possibly from different sources (the file system or by HTTP). Then the parts are combined (15, 16, 17) to a complete avatar image (18) and painted on the screen.

3D avatars on web pages are more flexible than 2D avatars, because components like clothing can be exchanged easier, if avatars are animated. Creating animated avatar images from 3D data is state of the art, but (again) doing so for avatars on Web pages is not.

Figure 3:
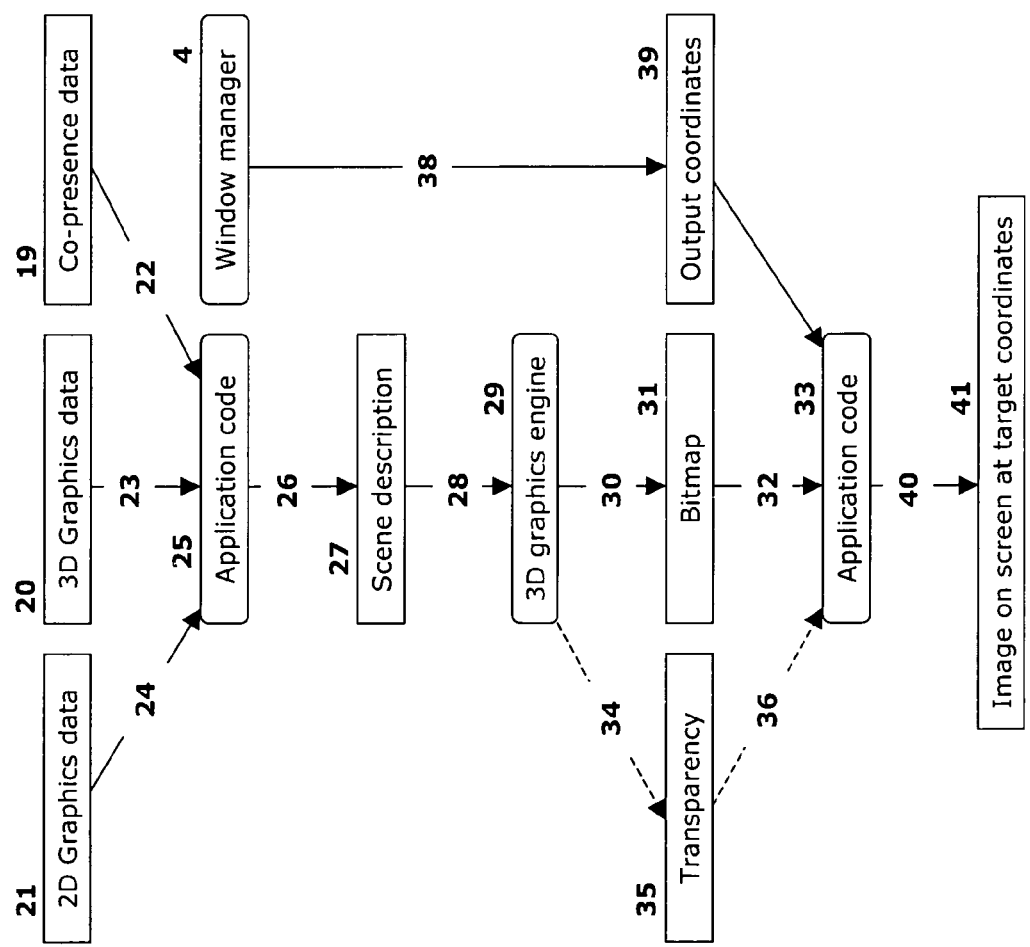
FIG. 3 is a flowchart showing production of an avatar image

In FIG. 3: The main part of the chart (19-36) describes how to produce an avatar image or animation. The lower part (4, 38-41) is the same as Flowchart 1 where the final drawing coordinates are calculated. In addition there is an issue with the transparency (35) of the avatar.

So, it starts with the co-presence manager, which again knows (19) which avatar consists of which 3D model (20) and textures (21). The program code (25) acquires all the data (3D model, textures, animation definitions and creates (26) a scene description (27). The scene description (27) comprises one or more avatars. It basically is a blueprint for the graphics engine to create something visible on the screen. Not all the data will be in the scene description (27) and go through the application code (25) to the graphics engine. Some data is only referenced, by pointer, name or filename. The scene description gets the reference (from 23, 24), but the actual data goes directly to the graphics engine (29). The graphics engine creates (30) a bitmap (31) for the screen. Usually, programs let the graphics engine paint the scene directly to the screen. They skip (31, 32, 33). But instead of the screen, we let it paint to the memory. Actually, the screen is also some kind of memory. The special feature is that you can see the contents of the memory as colors on the screen. The graphics engine paints the bitmap to a different, not visible, part of the memory.

3 pieces are needed to paint an avatar to the screen: the image (31), the destination coordinates (39) and a transparency mask (35). Some graphics engines provide the transparency mask (so called alpha channel) with the bitmap image (31 and 35 would be combined into an "image with alpha channel"). Some graphics don't provide an "image with alpha channel" or even no transparency mask. So, there is either a separate or no transparency mask. If there is none, then one is created, because it may not be desired to have the avatar to be a figure in a rectangular window. The avatar should be of arbitrary shape. In other words, the figure without the background, because the Web browser window makes the background. Therefore a transparency mask is needed, that defines the shape.

Having the transparency mask (35), the image (31), and coordinates (39), then it is possible to (33) paint (40) the image to the screen. Using the transparency mask, only the part of the bitmap, which is occupied by the avatar figure, omitting the background, is painted. If there is a real "alpha channel", this is a transparency mask, which not only tells, if a pixel belongs to the avatar, but also how much it belongs, then it is possible to overlay the avatar figure nicely over the screen background, which is usually the browser window. This is called "alpha blending". The drawing code mixes the image to paint (the avatar) and the background and makes a smoother appearance. It is important for us to use alpha blending (if an alpha channel is available) while painting avatars to the screen.

The actual painting is done by an operating system (OS) function.

There may be deviations, where it is possible to modify the OS and the Web browser code. If you can modify the OS, then you might implement steps (30, 32, 40) in the OS, even integrating (34, 36). As discussed in the previous section the "child window" mechanism may also make (39) obsolete for the application programmer. In another embodiment, everything beyond (29) from the flow chart could be eliminated. All the steps are still happening, but inside the OS and its supporting software libraries.

Another possible deviation is "pre-rendering". This means, that the avatar image or sequence of images for animations are painted to memory by (25-31) and stored in memory or on disk before it is needed. When the animation is actually needed, then it is painted to the screen by (19, 22, 25, 31-36, 38-41, 4). The actions are the same, only the order is different.

Game Avatars on Web Pages.

With the present invention, game avatars may be implemented on the web page. This is an important topic in addition to "3D Avatars on Web pages". There are several options to do this. The general idea is, that in multi user online games (MMOG, the double M for "massive multi user") players already have a character. Technically this character consists of data, that specifies appearance and capabilities. The data is stored on the server of the game operator, not the user's PC. The same is true for "not massive" multi user online games, where only few users play together. One embodiment involves "multi user online games where the character data is stored on the game server" (MOG).

Users use their game character. They adventure with it, they train it, they buy items for it. They let it walk around in the game world and talk to others through their character. The present invention describes a method for allowing this character to walk on Web pages. For this, the character data is exported from the game into our system. In one embodiment we produce and/or paint animated graphics which looks like the in-game character. In one embodiment, only the character without the game world is taken.

Figure 4:
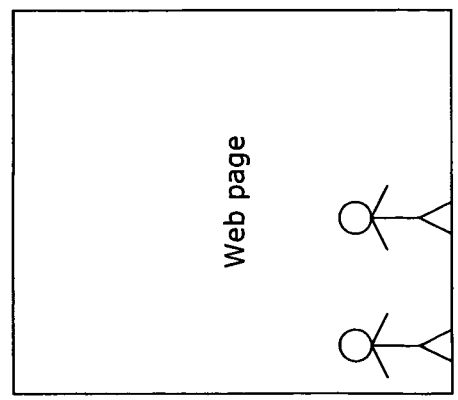
FIG. 4 shows avatars on a web page

FIG. 4: shows 2 game characters chatting on a Web page

Figure 5:
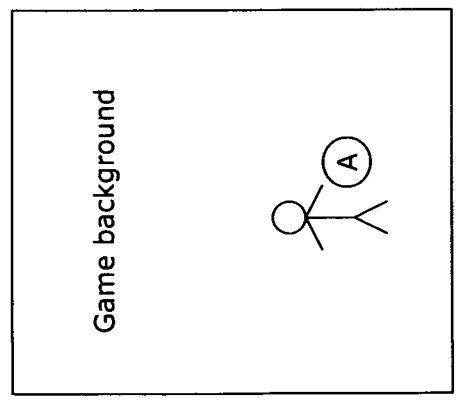
FIG. 5 shows an avatar in a game

FIG. 5: shows game character A in the game

Figure 6:
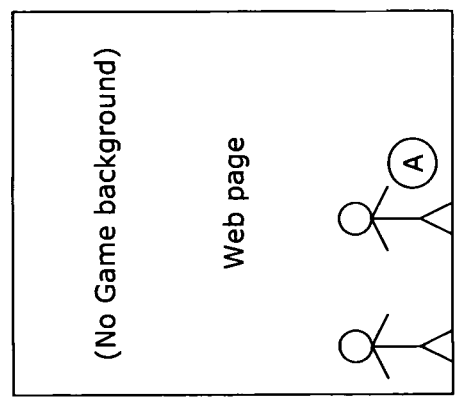
FIG. 6 shows avatars on a web page one from a game and one not from a game
Figure 7:
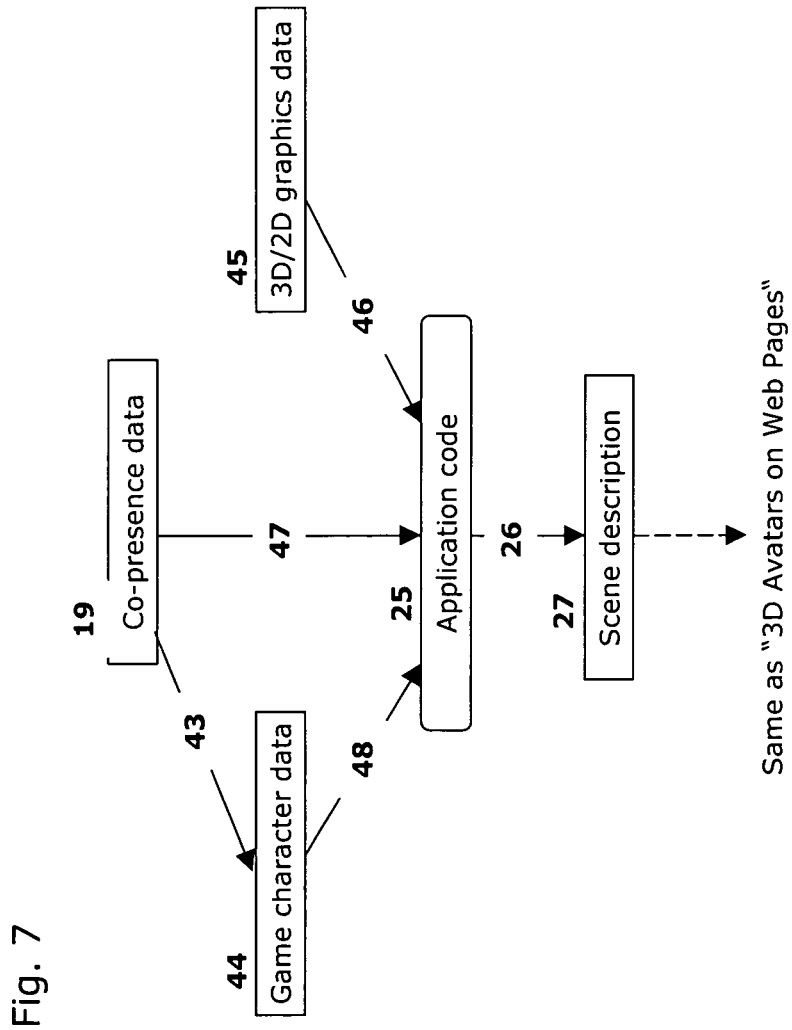
FIG. 7 is a flowchart showing a scene description

FIG. 6: shows the same game character A on a Web page without game background FIG. 7: Here, in addition to FIG. 3, the character data (44) has been added. The character data (44) defines the appearance of the avatar. In combination with the graphics data (45) and the co-presence data (19), the application code (25) of the VP client creates the scene description (27).

There is a difference between the character data and the graphics data. The graphics data defines how avatars "can" look like. It consists of many different 3D models, textures, and animation data. The character data defines which of these models to choose for the actual avatar. The graphics data holds all possible appearances. The character data selects a specific appearance.

Again the start is at the co-presence data (19). It tells, which avatar is to be displayed. Based on this information the VP client fetches (43), (46), (47) the game character data (44), which will be used (48) by the VP client application code (25) in combination with the graphics data (45) and the co-presence data (19) to produce (26) the scene description (27).

The graphics data (45) defines how avatars can look" and "the character data (44) defines how one actually looks". In other words: "the character data controls which graphics to use". This is a more detailed view, compared to when the co-presence data controlled which graphics to use.

In general, the co-presence data contains specifications for the appearance of the avatar. The nature of these specifications may differ. They can be a direct reference to certain graphics data or they can be an indirect reference. A direct reference would be the name of a 3D model. An indirect reference would be the name of a game character and the name of the game. With an indirect reference, the VP client application code can get the game character data, which in turn has direct references to 3D models.

Example 1

Co-presence Data with Direct Reference to Graphics Data (User name: A; 3D model; B; Texture: C)

The avatar of user A will be painted using model B and texture C.

Example 2

Co-presence Data with Indirect Reference to Graphics Data (User name: A; Game name: D; Character name: E)

A request (43) to the game server of game D specifying character name E may then return (44, 48) a direct reference to graphics data like:
(3D model: B; Texture: C)

So, that finally the avatar of user A will be painted using model B and texture C.

An avatar may consist of multiple models, textures, and other graphics data.

There may be more indirections. Programmers are very good in indirections, because it makes programs more flexible. Instead of containing a character name, the co-presence data (19) may have a reference to a database where the character name is stored. And the character name might go through several levels of indirection until the VP client application code (25) gets the name of the 3D model and other graphics data to use for the specific avatar of the user. But important is, that the co-presence data leads to a specific character's data. And the character data leads to specific graphics data.

A variant of the entire scheme comes into play, when such a system of "avatars on Web pages" is developed by a game operator. The "avatars on Web pages" may be closely integrated with the game client. It may be so close that (19, 43, 44) again are combined indistinguishably into one component. There may be no separate network connection or remote access (43), because game clients already have connections to their game server. But still, whether they call it "fetching (43) the game character data (44)" as I wrote above or if they "just use the game character data": the specifications in the game character data are employed to define the appearance of avatars on Web pages.

The previous section described how avatars are associated with Web pages so, that the avatars appear to be on or at the Web page. It described primarily, window positions, avatar positions, and graphics information are combined to achieve the visual effect of associating avatars with Web pages.

This section will disclose more details of the system which produces avatars on Web pages. These technical details are necessary in addition to the information above to construct a complete workable system.

The present invention sets out a system which does not create a meeting room, but instead sets out a system where the meeting takes place at a data resource such as a web page. The invention may be described as a web copresence system. For purposes of this invention and any related patent(s), the terms associated with the phrases virtual presence (VP) and copresence refer to the web copresence characteristics of the invention and are to be interpreted in this sense. Likewise a copresence server and a virtual presence server refer to a web copresence server. A copresence client and a virtual presence client refer to a web copresence client.

Avatars are the visual part of virtual presence on Web pages.

A system of software components is necessary to generate these avatars so, that their display represents other users on the same Web page or group of Web pages. The window manager, co-presence manager, and graphics system components are located close to the Web browser program, usually on the same computer as the Web browser program. The computer is called the "client computer" and the application code, which displays the avatars using external software libraries, data, and information the "co-presence client" or "virtual presence client". In addition to the virtual presence client, there operates a virtual presence service, which might comprise multiple computers.

The virtual presence service has at least 3 functional components: 1. the co-presence server, 2. an avatar server, and 3. a communication server. The co-presence server and the avatar server cooperate to visualize avatars associated with Web pages, while the communication server provides a basic communication facility for text exchange between users, which are represented by the avatars. This chapter describes how the co-presence server and the avatar server cooperate to display avatars.

Figure 8:
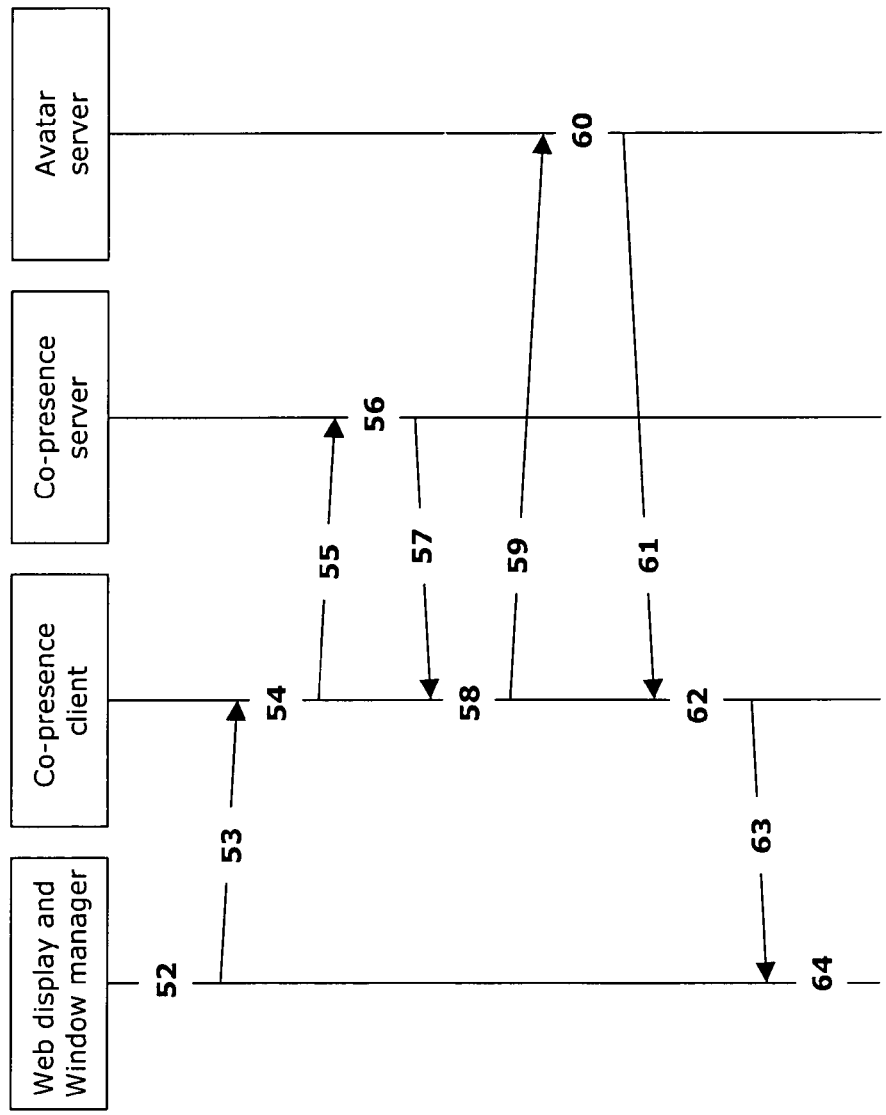
FIG. 8 is an information flowchart

In FIG. 8, the Web browser displays (52) a Web page. The co-presence manager receives (53) the information about the Web browser window position and the Web page address (URL). The co-presence manager is a part of the co-presence client. It uses (54) the Web page address information to communicate (55) with the co-presence server in order to tell the co-presence server about the presence of the user on the Web page identified by the Web page URL. More about what happens in (54) later. The co-presence server in turn uses (56) this information to create a co-presence list of users on the same Web page. The co-presence server sends (57) the co-presence list back to the co-presence client. Actually, it sends co-presence lists to multiple co-presence clients, so that all clients can visualize the avatars of users.

In this phase, the co-presence client knows (58) about the presence of other users, but it does not yet know how they look like. The co-presence client uses information received in (57) to request (59) information about the appearance of the other users' avatars. This happens at all client computers for all peers, but this description will continue to describe the display of a single avatar on a single computer display. The avatar server (60) returns (61) information describing the appearance of the avatar. As described above, the phase comprising (59), (60), (61) may be repeated several times, if the avatar server does not return a complete set of graphical information. The co-presence client may receive (61) only a reference to graphical data from the avatar server. It then repeats steps (59), (60), (61) in order to get more data until it finally got enough information to be able to combine (62) the graphical information in order to render (63) the avatar to the screen (64) in a screen position where it appears associated with the Web browser window (52) that started the process by presenting the Web page.

The steps (59), (60), (61) may be repeated with different destination addresses to get different kinds of information from different physical or logical servers. "The avatar server" term is used, although it might comprise multiple physical servers and software components.

The avatar server is part of the system. It serves static images, animated 2D graphics, and 3D graphics data. As an optimization, graphical data is installed on the client computer so, that it can be used without being transferred in (61). The avatar server will then only send (61) an identifier of the graphical data instead of the actual data. For the co-presence client there is no big difference, if the avatar server transfers the data or an identifier (e.g. a number) of locally available data, except for the amount of data transmitted. After (61) the co-presence client knows which graphics data to use to display the avatar.

The avatar server also sends (61) additional information used by the co-presence client to augment the avatar display, such as a name, graphics data or its identifier which are used to attach graphical tags to the avatar to visualize various states of the avatar or the user.

In another variant, the avatar server is not part the core system, but rather associated (external). Avatars may look and behave like avatars from other virtual worlds, specifically game avatars from online games. The game server, not the internal avatar server, defines how its game avatars look like. In this case, the co-presence client includes requests to the game server during the (59), (60), (61) phase. The first request to the internal avatar server might return only the name of the game, the game server address explicitly or implicitly, and the name of the user in the game. The second request to the (external) game server will then return a description of the avatar. This indirection has been described above.

This section will explain more details of the interaction between the co-presence client and the co-presence server as seen in FIG. 8 steps (54), (55), (56), and (57).

The co-presence service consists of at least one co-presence server. The system could run on a single very powerful co-presence server, but practice shows, that it is advantageous to distribute load and responsibility over many co-presence servers. A single co-presence server is responsible for a group of Web pages which are defined by their addresses (URLs). This group of URLs may be as small as a single URL, it may span a single Web site with multiple URLs, or it may span multiple a very large number of Web sites with URLs of different internet domains. The term "responsible" means two things: 1. the co-presence server generates (56) co-presence lists for the Web pages in its responsibility. 2. co-presence clients announce (55) their presence to the responsible co-presence server.

Since there can be (and actually are) many co-presence servers, the co-presence client must identify during (54) the responsible co-presence server to announce the presence on the Web page. The identification of the co-presence server responsible for a given URL happens at all client computers in the same way, so that for each URL all co-presence clients derive the same co-presence server address.

Users navigate with their Web browser programs to the same Web page independently of each other. But still, all co-presences clients announce the presence to the same (responsible) co-presence server. The co-presence clients do not know about each other during this phase. They do not communicate in order to agree on a single co-presence server address. They all derive the same co-presence server address from the URL of the Web page using a set of rules.

This is a distributed decision making where all co-presence clients derive the same result independently, because they all start with the same or similar information (the Web page URL) and use the same rules in the process.

Figure 9:
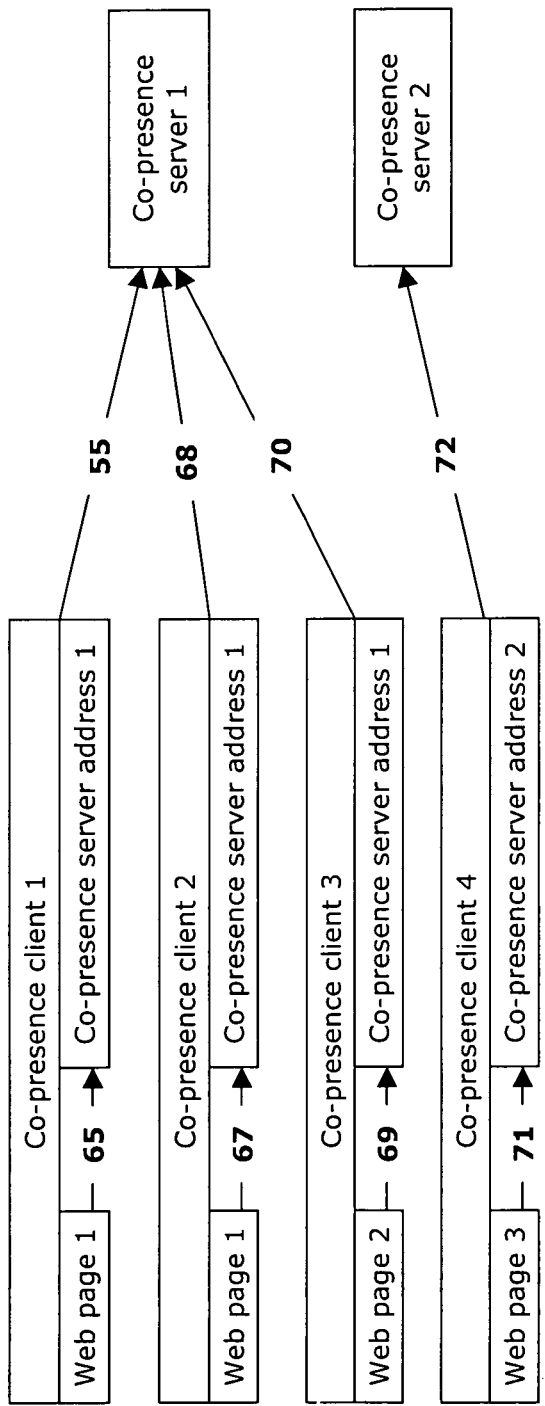
FIG. 9 is a co-presence server address flow chart

In FIG. 9, a co-presence client 1 learns that the Web browser navigated to Web page 1. It uses (65) rules to compute the address of the responsible co-presence server. In this example the result is co-presence server 1. Then co-presence client 1 announces (55) its presence to co-presence server 1. Co-presence client 2 has the same URL to start, uses (67) the same rules to get the same co-presence server address and announces (68) the presence to co-presence server 1. Co-presence client 3 may have the URL of a different Web page, because the user navigated to a different page than the previous two users. It uses the same rules and gets (69) the address of co-presence server 1 as result. This means, that co-presence server 1 is responsible for Web page 1 and Web page 2. Co-presence client 3 will also announce (70) its presence to co-presence server 1. Co-presence client 4 has another URL identifying Web page 4. It derives (71) the address of co-presence server 2 and announces (72) its presence to this server. This means, that co-presence server 1 is responsible for Web pages 1 and 2 and co-presence server 2 is responsible for Web page 3.

The process to compute (65), (67), (69), (71) the co-presence server address from a URL is called "location mapping". Location mapping is explained in the next section.

Location mapping is done independently by all co-presence clients. They use common rules to compute the same output data based on the same input data.

Figure 10:
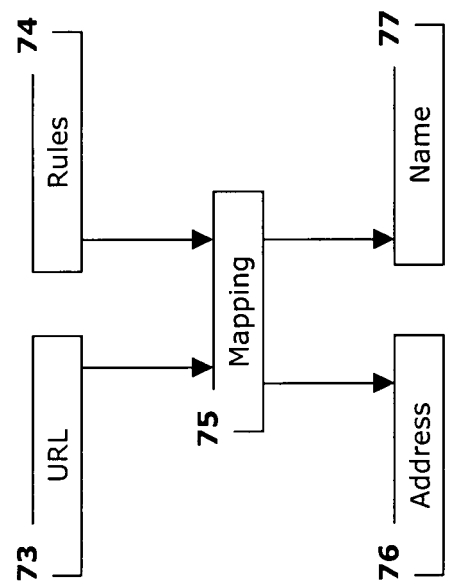
FIG. 10 is a location mapping flowchart

In FIG. 10, the input data to the location mapping process contains at least the URL (73) of the Web page. A set of rules (74) is applied (75) to the input data. The results of the mapping process are at least an address of the responsible co-presence server (76) and the name or identifier of a co-presence channel (77). The purpose of the channel name (77) is to differentiate between different virtual locations at the same co-presence server. The channel name is a more general term than the URL. The channel name can be equal to the URL. But it can also be different. It is very common, that different URLs (73) result in the same channel name (77) at the same co-presence server (76). The channel name will usually be constructed in a way so, that the co-presence server can use it for internal processing.

"Regular expressions" are used for the mapping process. The rules (74) contain regular expressions and the mapping (75) evaluates the expressions, applies them to the input data and uses so called "replacement terms" to create the output data (76) and (77). The mapping process also uses hash functions, e.g. a message digest like SHA1 or MD5, to create unique identifiers as channel names. The order of processing to generate the name (77) is such that the regular expression is applied to the URL, then the replacement is constructed using the replacement terms. Then a message digest function turns the result of the replacement process into a string of character data. The message digest is optional. The address (76) generation goes through the same procedure omitting the message digest.

Regular expressions and message digests are used for the mapping process, but in general the mapping process is a function with input data (73) as arguments and output data (76), (77) as result. The rules (74) are not the function. The rules are used by the mapping function. The function is defined by the way how (73) and (74) are used to produce (76) and (77) as described by the previous section.

As an extension, the input data (73) can be augmented by additional information, such as the preferred language of the user or other user specific parameters. These additional parameters change the result of the mapping process, so that the output data is specific to a sub set of users. E.g. a language parameter may result in different output data for users of different languages, although they all navigated to the same URL.

The output address (76) may contains a protocol identifier in addition to the network address of the responsible co-presence server. The protocol identifier defines which network protocol must be used by the co-presence client to announce the presence to the co-presence server. The protocol identifier may be omitted, if the co-presence client is bound to a single protocol and if the system comprising the co-presence client(s) and co-presence server(s) will use only a single network protocol. The protocol identifier is then implicit, because all software components use the same network protocol.

Using an explicit protocol identifier in the output data of the location mapping process allows us to support different network protocols. A first Web page defined by its URL will result in a first co-presence server address (76). This address may contain a first protocol identifier. If it does so, then the co-presence client will use the first network protocol associated with the first protocol identifier. A second URL may result in output data with a second protocol identifier in the co-presence server address (76). Then the co-presence client will use a second network protocol to announce its presence to the co-presence server.

As a variant, the mapping rules can be trivial so, that the rule contains a co-presence server address (76) and a channel name (77) for each URL (73). Given a URL, a rule can then simply consist of the combination of channel name and co-presence server address, omitting regular expressions or other processing instructions. If the co-presence server address is implicit, e.g. if the co-presence client always uses the same co-presence server address, then the address may be omitted, reducing the rule to a channel name.

Independent co-presence clients use the same rules to derive the same results from the same input data. Several mechanisms are used to provide co-presence clients with mapping rules. Different rule acquisition mechanisms are used to meet additional design goals.

A first goal is to supply the same rules to all clients. We store rules in files on network accessible servers. Clients download the rules. The complete rule set for all URLs of the entire Web is split up into smaller parts, so that clients do not have to download all rules at once. The partitioning is done along internet domain names in a hierarchical fashion. A client which needs a mapping rule for a .com domain name will download only the rule set for .com domains. This set might be split up further into smaller chunks, e.g. alphabetically.

The second goal is to make the system work under difficult network conditions including server failure of the server providing the rule. For this we supply the client with default rules, which will be used in case the client can not acquire rules over the network.

Clients use the HTTP protocol to acquire rules from the mapping rule server. But in general, we can use any data access network protocol to get the rules. In our case, where users navigate their Web browser programs to Web pages using the HTTP protocol, HTTP as a rule acquisition protocol fits well into the picture. The rule acquisition may use other protocols as well.

A third goal is to let the operator of the Web page control the mapping process. For this reason, co-presence clients try to acquire mapping rules for the URL of the Web page from the Web server that sent the Web page. The co-presence client uses the Web server address of the Web page URL to guess the URL of a mapping rule file on the same Web server as the Web page. This is done by appending a common file name to the Web server address. Other parts of the Web page URL may also be included into the URL of a mapping rule file.

Since mapping rules may apply to multiple URLs and since users often navigate to similar URLs in a Web browsing session, we store acquired mapping rules to re-use them later. This reduces overall network traffic. In other words, mapping rules may be cached.

A forth goal is ease of use for Web page authors. The co-presence client may retrieve mapping rules from the Web page data directly, if the mapping rule is embedded into the Web page or by reference, if the mapping rule file is referenced by the Web page data.

A fifth goal is flexibility for the Web server operator. The Web server might return the mapping rule for a Web page as part of the network protocol used to transmit the Web page data. For HTTP this means, that the rule or just the co-presence server address and the channel name are transmitted in the HTTP header data as a so called HTTP header field. This is especially convenient for Web page providers, who are able to modify the Web server response. This mechanism is similar to the one used to meet the forth goal in that the Web server voluntarily provides the mapping rule without being asked. This makes the acquisition simple for the co-presence client and removes the need for separate requests to get mapping rules.

The virtual presence network comprises co-presence clients and many servers of different purpose. The most important server types are the co-presence server, the mapping rule server, the avatar server, and the communication server.

The avatar server basically provides information about the appearance of avatars. It uses a data protocol suited to provide data on request. We use HTTP as data protocol and various data formats, like plain text, XML, GIF, JPEG, PNG, and 3D model data formats.

The rule server uses one of the mechanisms described in the previous chapter to provide mapping rules.

This section is primarily about the co-presence server and the communication server. The co-presence server generates co-presence lists based on presence announcements from co-presence clients and sends these co-presence lists to the co-presence clients. Co-presence client and co-presence server use a co-presence protocol to communicate.

The co-presence protocol can be a specifically designed for the purpose of communicating co-presence information, but there are already protocols which offer all required services. One class of such protocols are chat protocols. There are various existing text based chat systems. A chat protocol can be used as co-presence protocol.

A usual chat server manages multiple chat channels with multiple participants each. If co-presence clients join a chat channel as chat participants, then the participant list can be regarded as a co-presence list. The chat server sends the participant list to participants (on request or automatically). In other words: the chat server as co-presence server compiles a co-presence list and sends it to co-presence clients. The participant list can be sent in small pieces or as a complete list. This depends on the chat protocol.

Of course, the chat server also serves as a text based communication server, because this is its original purpose. A discovery was, that almost any chat server/protocol can be used as co-presence server/co-presence protocol, because it provides co-presence lists and a communication service.

XMPP and IRC server software are used as co-presence servers and appropriate protocol implementations for these protocols in the co-presence client. The XMPP and the IRC protocol are used as co-presence protocols. But there are other chat protocols, which could also be used. It is the purpose of the protocol identifier in the co-presence server address to select the protocol for the communication with the responsible co-presence server.

The Web site, which sent the Web page, can control the location mapping process by providing mapping rules. The mapping process can output a co-presence server address with a protocol identifier. So effectively, the Web site operator can control which protocol is to be used to show avatars on the Web pages of the Web site. Of course, the co-presence client must be able to use the protocol. If the protocol implementation is not available to the co-presence client, then it can not show co-presence on the Web page. If this happens, the co-presence client may fall back to another protocol, though.

Some chat protocols may have additional features or requirements. For example, some require a registration with another server. If a co-presence client uses XMPP, then it needs a XMPP account on a XMPP server. The co-presence client will connect to the XMPP server and send all co-presence and communication messages via this server. So, in case of XMPP, the communication between co-presence client and co-presence server is indirect via a XMPP server. Other chat systems may use direct connections but may still require a registration. These are protocol specific requirements, which a co-presence client must meet in order to be able to use the protocol. But whatever the protocol and associated server software requires, after all, there is co-presence communication and chat communication between the co-presence client (which implements a chat client component) and the chat server (which serves as co-presence server).

Figure 11:
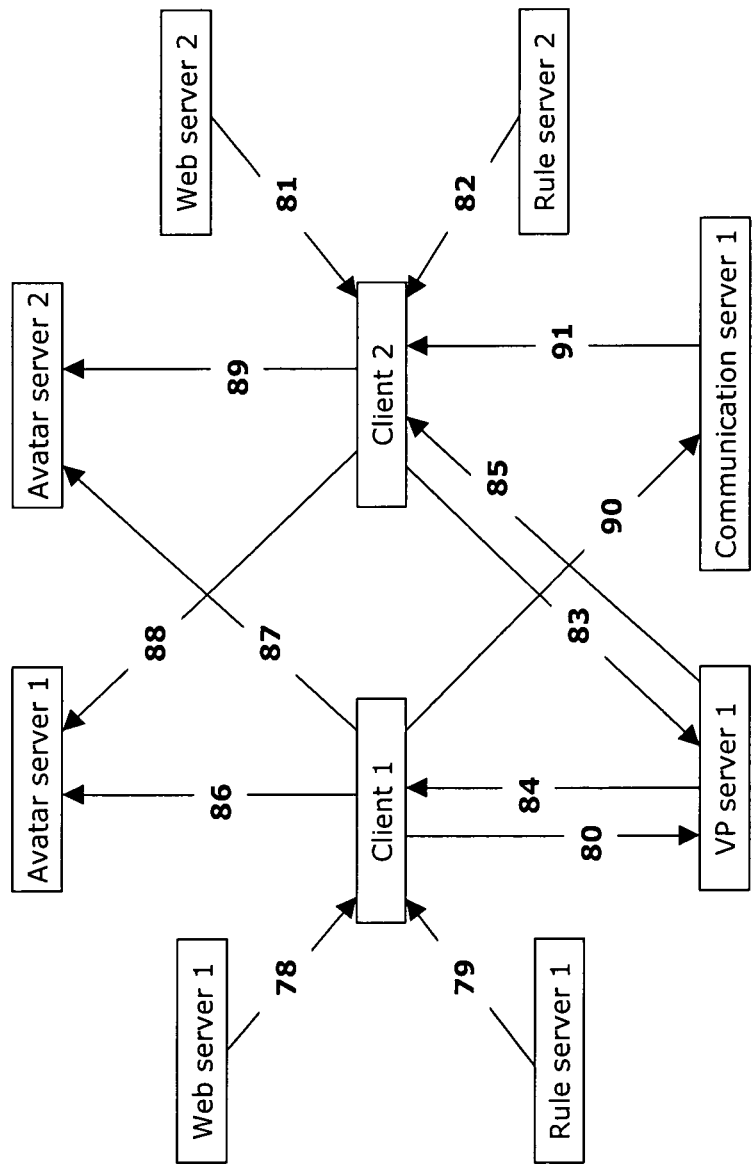
FIG. 11 is a component interaction flowchart

FIG. 11 explains the information flow for a very common scenario. The scenario is such, that a Client 1 comprising at least a Web browser and a co-presence client enters a Web page of Web server 1. "Entering" means, that the Web browser navigates to the URL and display the Web page content on the computer display in the Web browser window. Client 2 enters a different Web page, in this case even a page of a different Web server. Both users will be represented on both computer displays as avatars associated with the respective Web browser window. In the chosen scenario, the avatar information is stored on different avatar servers. Finally both users can exchange text messages. The information flow is as follows:

Co-presence client 1 gets notice (1) about the Web page from Web server 1 (the Web page is from Web server 1, not the notice). It acquires (2) mapping rules from rule server 1 and computes the co-presence server address, and the channel name. The co-presence server address may contain a protocol identifier. The co-presence client chooses the appropriate protocol and announces the presence (3) to VP server 1 using the channel name.

Co-presence client 1 gets notice (78) about the Web page from Web server 1 (the Web page is from Web server 1, not the notice). It acquires (79) mapping rules from rule server 1 and computes the co-presence server address, and the channel name. The co-presence server address may contain a protocol identifier. The co-presence client chooses the appropriate protocol and announces the presence (80) to VP server 1 using the channel name.

A second client gets notice (81), that the Web browser of client 2 shows a URL from Web server 2. It acquires the mapping rules (82) and derives the co-presence server address and channel name, which happen to be identical to the mapping output data, which client 1 got. So, co-presence client 2 announces (83) its presence as client 1 did before. Both joined the same channel on the same server.

VP server 1 creates a co-presence list which contains an identifier of client 1 and an identifier of client 2. It sends this presence list to both co-presence clients (84), (85).

Client 1 now knows about the presence of client 2. It has an identifier of client 2, but it needs graphical avatar data to display the avatar. The co-presence list contains a reference to the avatar server where the appearance of the avatar of client 2 is stored. Client 1 also knows where its own avatar data is stored. So, it requests avatar data for its own avatar (86) from avatar server 1 and avatar data for the avatar of client 2 from avatar server 2 (87). Client 2 does the same (88), (89). Both can now display their own and the other client's avatar. They will display the avatars at a screen position which shows the association of the avatars to the Web page. So, it appears to both users, that they meet "on" the Web page.

Client 1 can now send (90) a text message to communication server 1. The communication server will forward (91) the message to client 2. VP server either is identical with communication server 1 or both components communicate so, that the communication server knows which message to forward to which clients.

In practice, there are many variants possible and probable. Components shown as separate boxes may be implemented by the same software module, or if implemented as separate programs, they may execute on the same computer. Examples for such integrated services are:

Web server 1 and rule server 1: Web server 1 may provide rules for the mapping of its URLs or Web server 1 may supply (potentially trivial) rules automatically with the data response.

VP server 1 and communication server 1: since usual chat servers provide a list of participants in a chat channel, they can also serve as VP server. The list of chat participants is regarded as a co-presence list. The chat server mediates text messages between participants and sends participant lists (on request or automatically) to the participants.

Rule server 1 and rule server 2: assumed Web server 1 does not provide mapping rules for its URLs, then both clients turn to a standard location to request the mapping rules. In this case they will use the same server.

Client 1 and avatar server 1 can be on the same computer and they can even be the same software program: in a variant, the avatar information is not stored on or provided by a separate avatar server, but by the client program. This means that client 2 requests avatar data from client 1. In other words: avatar server 1 is integrated with client 1.

A large part of the overall network traffic in this system results from the transmission of avatar data. Any co-presence client which is going to display the avatar of a user acquires the avatar data of this user's avatar. Over time, a user meets many other users which means, that the co-presence client display many avatars. It is very likely, that users meet each other repeatedly. When they do, then it is advantageous to re-use the avatar data, which has been acquired earlier. This saves repeated transmissions of the same avatars data. The mechanism is called caching.

Caching requires an invalidation strategy. The cached data is a local copy of the original data on the avatar server. The local copy may be outdated, if the original data changes. This happens, when the user changes the avatar (e.g. the user chooses another t-shirt for it's avatar). The user may change the name or the 3D model, or another feature. The user changes the avatar data on the avatar server, so that subsequent transmissions to other users' co-presence clients transfer the changed data. But there are cached copies stored by other co-presence clients. These cached copies are now outdated. This fact becomes significant if users meet again and a co-presence client is going to use the cached local copy. If it just uses the cached local copy of the avatar data transmitted earlier before the change on the avatar server, then it will not display the latest image. It will display an outdated version. Users usually regard this as "the wrong image". So, the caching co-presence client needs a mechanism to protect itself from displaying outdated data without transmitting always the new data. Because transmitting always the new data would mean no caching at all. The co-presence client needs a way to invalidate the cache and re-acquire the new avatar data, if the data changed and if the data is needed for displaying the avatar.

We are using a version based invalidation strategy. Avatar data is accompanied by a version identifier. The client stores the version identifier, when it stores (caches) the data locally.

When the client is going to display the avatar, it compares the version identifier of the cached data to the latest version identifier. This means the client needs the latest version identifier.

We are now looking closer into the co-presence data sent by the co-presence server. The co-presence client gets three pieces of information for every user: 1. the user identifier, 2. an avatar data identifier, 3. an avatar version identifier. The first tells the co-presence client which user it is going to display as avatar. The second tells which avatar to display and where to get the avatar data. The third is compared to the stored version identifier to find out, if the local copy of the avatar data is outdated.

A variant may merge the user identifier and the avatar data identifier into a single identifier. The avatar data identifier may be implicit, if the co-presence client can use the user identifier to access the avatar data. Or the user identifier may be omitted if the avatar data identifier also serves as user identifier.

A variant may not include the avatar data identifier and the avatar version identifier into the co-presence data. If the co-presence data contains only user identifiers, then there may be another way to get avatar data identifier and avatar version identifier. The co-presence client may request these two avatar related identifiers for each user identifier.

The avatar data identifier may include the complete address information. We are using the URL of the avatar data as avatar identifier.

Parts of our system use message digest functions to generate version identifiers. Other parts use a simple number based versioning. Number based versioning is especially feasible, if a common number generator is available. Message digest based versioning is more compute intensive, but can be used by independently operating components, which can not access a common number generator. How version identifiers are generated does not matter. The important point is that the version identifier changes, if the data changes.

The avatar data comprises data required to display a user's avatar. It may contain text for the avatar name, 2D graphics data as avatar image or as texture for 3D models, 3D models, and other additional information which defines appearance, behavior, or capabilities of the avatar. Some information may be as a reference only. The client will substitute the reference by the real data from local or remote storage. So, there might be a reference to a 3D model in the avatar data, while the actual model data is already available to the client or can be acquired using a data protocol.

Figure 12:
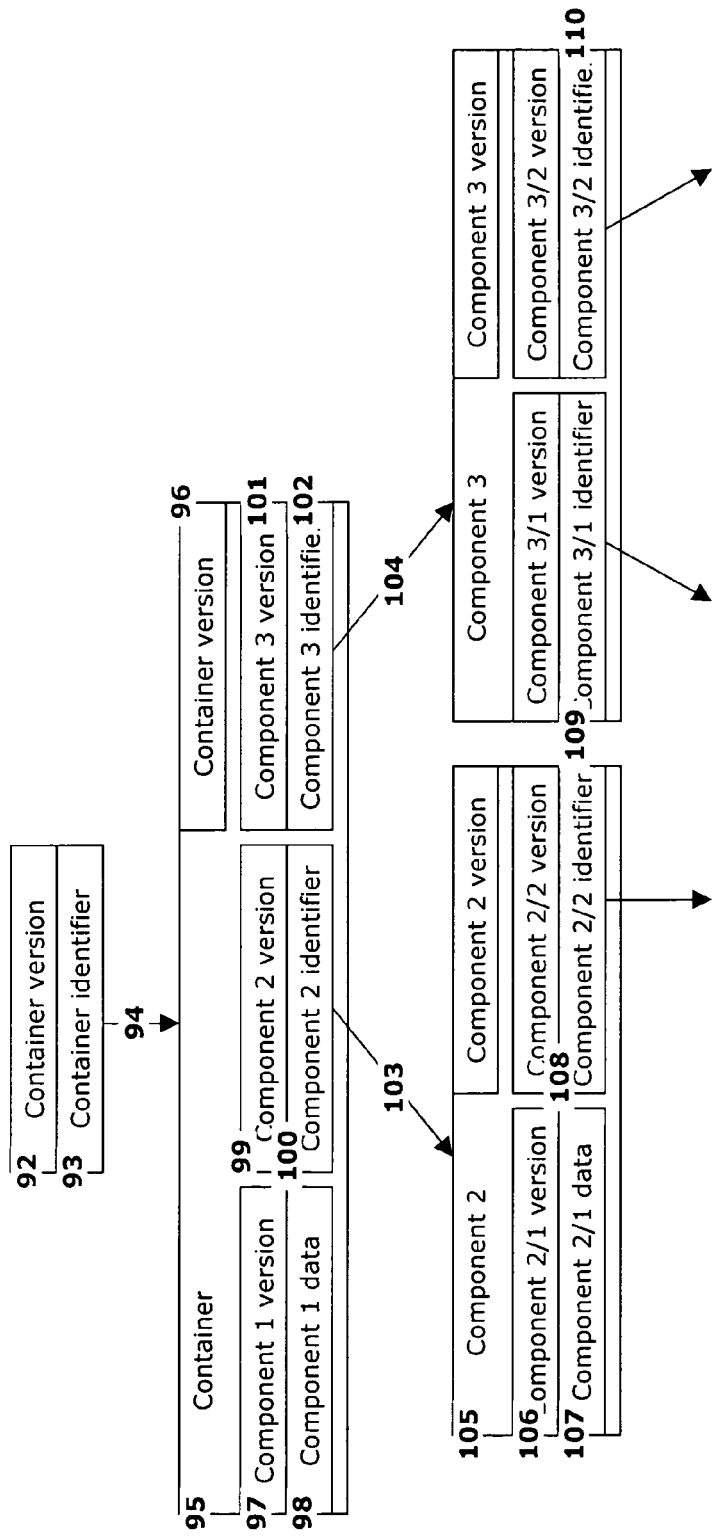
FIG. 12 is a hierarchical data organization flowchart

In FIG. 12, the avatar data is organized hierarchically. It contains various sub-components for different aspects of the avatar (e.g. name and image). These sub-components can change independently from each other. If only the name changes, then it is not necessary to re-transmit the image. Only the name needs to be re-transmitted. For this reason each sub-component is accompanied by its own version identifier. Each sub-component data may be directly included or included by reference. Including a sub-component by reference means, that the data contains a sub-component identifier, just like the avatar data identifier represents the avatar data. The repeated inclusion of identifiers, which refer to other data with a similar structure makes the entire structure a tree of avatar components. The inclusion of a version identifier for each part adds a component based caching feature.

To make things clear I will go through the tree explaining the relationships. We start with the avatar data identifier (93), which references (94) the avatar data (95). We call the entire structure the "avatar data container". As described above, the avatar data identifier is accompanied by the avatar version identifier (92) This identifier may be repeated (96) in the data container (95) to make the container self consistent.

The container may have three components (98), (100), (102), each accompanied by a version (97), (99), (101). Component 1 consists of embedded data (98), while components 2 and 3 are identifiers, which point (103), (104) to structures similar to the container. Component 2 (105) again consists of a data component (107) and an identifier component (108). Component 3 has two identifier components (109), (110), which reference other data containers.

Components themselves be another container.

Data components may either contain the data or reference the actual data. Such a data reference is different from a component identifier, because it does not reference another data container. It references data, such as a JPEG image.

Using this data structure a co-presence client can cache avatar data and still display always the latest version without the need for re-loading all the data. Only the changed data is re-transmitted, even though it may be only a sub-sub-component.

As described above, version identifiers change when the data changes. A data change propagates from bottom to top through affected version identifiers. Say the component 2/1 data (107) changes. Then the version identifier (106) is re-computed. The version identifier is part of the data of component 2 (105). So, component 2 has changed. This means, that the component 2 version identifier (99) changes. This is part of the container data and changes the container version identifier (96). Finally a co-presence client gets a changed version identifier for the avatar data container. It will descend into the tree of data structures, fetching one after the other where the version identifier has changed until it reaches the actually changed data component. While fetching the changes sub-components needs time and makes network traffic, we still expect, that this traffic is much lower than re-transmitting all data instead of only the changed data.

XML is used as the data format of the container.

The previous section described necessary requirements and installations for a system which generates co-presence with avatars on Web pages.

This section describes details of additional features, which make the system described above richer and practically usable beyond a pure avatar display.

Avatars are the primary user interface. All program functions can be accessed via the avatar. If a user clicks onto an avatar with the mouse, then a menu opens which gives access to program functions. A double click onto the avatar executes a standard action, which can be defined by the user.

A very important function is text based chat. Users can enter text into a text window. Other users on the same Web page can see the text window and read the text.

Figure 13:
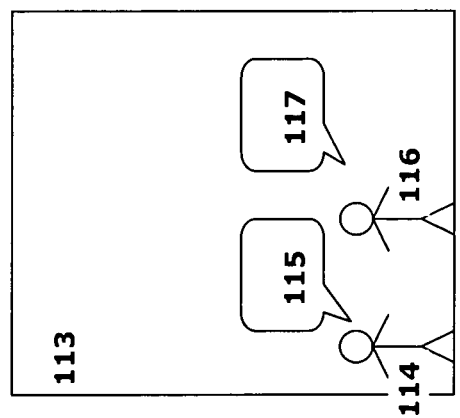
FIG. 13 shows personal text windows of users on a first screen
Figure 14:
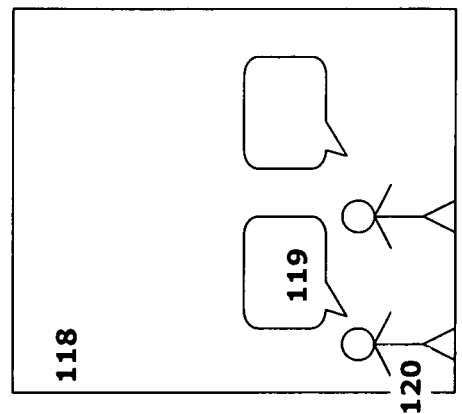
FIG. 14 shows personal text windows of users on a second screen

In FIGS. 13 and 14, there is at least one text window (115), (117) per avatar (114), (116). We call such a personal text window a "chat balloon". A user with a Web browser (113) at a first computer screen types text into the "own" chat balloon (115), the co-presence client sends this text to the communication server. The communication server forwards the text to other co-presence clients. These co-presence client of another user at a second computer screen with Web browser (118) displays the text in a chat balloon (119), which is associated with the avatar of the user (120) who sent the text.

The chat balloon may only be visible, if it contains text. The user can instruct the co-presence client to show or hide the chat balloon.

The chat balloon may fade away after some time by becoming transparent at different levels from opaque to completely transparent to indicate the time since the text was sent or received.

In addition to personal chat balloons there may be a text chat window, which contains all text received with avatar names to indicate the sender and optionally time stamps to indicate the time when the text was sent or received.

Special users may be able to control the text flow by editing or deleting text before it reaches all co-presence clients. They may force other co-presence clients to leave the communication channel by means of control messages. They may configure the communication channel or the co-presence server in various ways, e.g set a password, which is then required before a co-presence client is admitted to the communication channel. They may prevent other users from joining the channel permanently or temporarily. In other words: there may be moderators.

In addition to text based chat we transmit sound between co-presence clients. We use a technique called Voice over IP (VoIP). The difference to usual VoIP tools, like internet phones lies in setup and management of the VoIP transmission.

Usual internet phones require the user to select a communication partner by typing a number, an identifier or by selecting it from a computer based telephone book. Whether the user establishes a two party call or a multi party conference, whether the actual sound data is transmitted directly between the users' computers (peer to peer) or via a conference server, people are used to set up the communication by at least one instruction to their internet phone software. In our system we omit this setup instruction. We make an implicit conference call setup.

This could be called a zero-click-call.

Users simply navigate to the Web page, avatars appear and anything a user says is transmitted to the other users' computers and output to the loud speaker. In other words: you just go to the page and speak. Other concurrent visitors will hear you. This is very different from explicit call setup. Even if there are already systems with implicit call setup, there is none for avatars on Web pages.

The system makes a call setup to a VoIP communication channel. The address of this channel may be supplied by the text communication server or it may be included with the location mapping rules for the Web page. As a variant the VoIP address may be acquired completely independent by a separate mechanism. Wherever the VoIP address comes from, it is a VoIP address specifically for the Web page, just like the text communication channel and the co-presence channel name are per Web page. The client connects to this VoIP channel automatically by means of a VoIP setup protocol and accepts sound input to the microphone.

The text communication channel may be used for the call setup. This means, that the text chat serves as a signaling channel for the VoIP connection. The signaling data exchanged is usually invisible to users in order to not disturb the text chat conversation.

Of course, there are many messages exchanged. All internet communication between users and pieces of software is via exchange of messages. But this is not a messaging application. It is at least co-presence, if not virtual presence.

Figure 15:
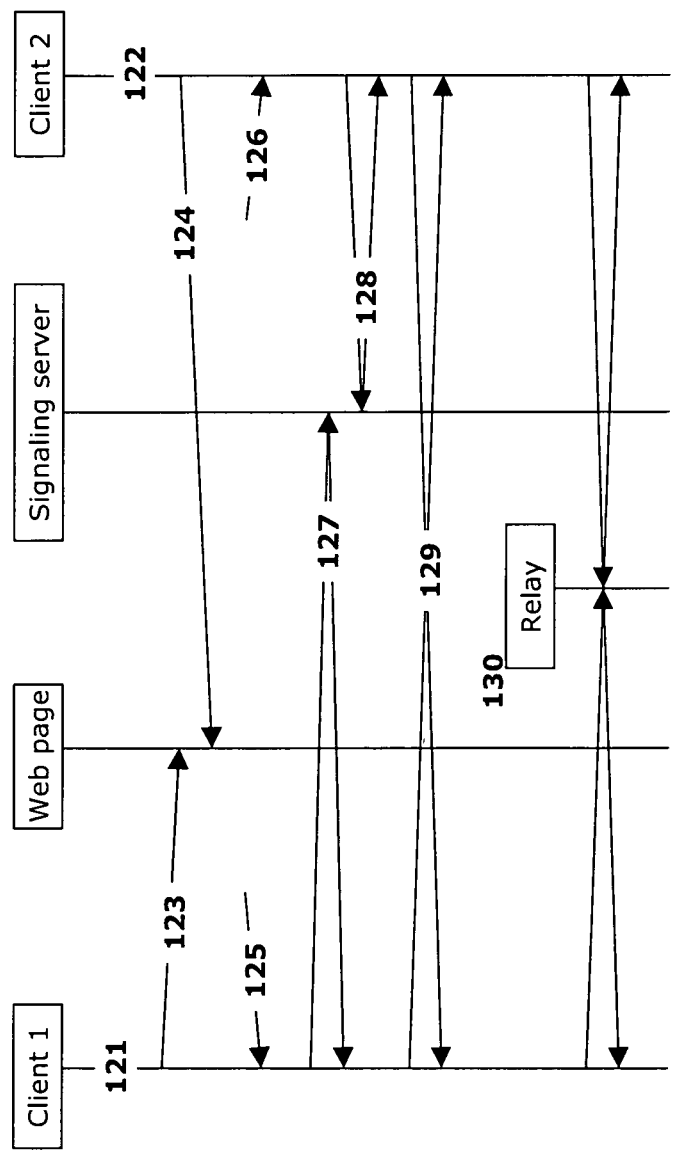
FIG. 15 is an automatic call setup flowchart

In FIG. 15, the processing flow for automatic call setup is as follows: The user operating client 1 decides (121) to go to a Web page. The user selects the Web page from the favorites, types in a URL or clicks a hypertext reference. User 2 may do (122) something different, but both end up on a Web page (123), (124). The virtual presence mechanisms do their work as described in earlier chapters and notify (125), (126) both users of the presence of the other user. If the co-presence client is configured to establish a VoIP connection automatically, then it proceeds with signaling (127), (128) to a signaling server in order to establish a VoIP call. After the call has been established at least one client (129) records sound data and sends it to the other client. Instead of sending directly to the other client, it may send the data via a relay server (130).

The only action of the user is to choose a Web page. Everything else happens automatically until they can talk to each other.

Any explanation in this section also applies to video transmission instead of or in addition to VoIP.

The user may be away from the computer, while the Web browser program displays a Web page. To indicate to other users who might visit the same page, that the user is not at the computer and unable to respond, a small image may be attached to the avatar, which indicates the state, a so called "online status tag". The tag may assume various states, one at each time to indicate different levels of activity/inactivity of the user.

The tag may be attached automatically after some time, if the user does not type anything on the keyboard or does not use the computer mouse.

The tag may be attached on request by the user.

In addition to attaching a tag or instead of attaching a tag to the avatar, the avatar might be displayed transparently to indicate, that the user is "not really there", although the Web page is open.

In a variant, the co-presence client may automatically leave the Web page by sending a notification to the co-presence server while the Web browser still shows the Web page. The effect is that all avatars disappear. When the user returns from inactivity, then the co-presence client may notify the co-presence server about the renewed presence.

The location mapping rules contain Web page specific information for the location mapping process. Attached to the rules may be other Web page specific information, which is used to control various aspects of the virtual presence on the specific Web page.

The mapping rules and the additional information may be called the "virtual presence information" (VPI). Examples for additional information are:
  the address of a VoIP channel,
  identifiers or a reference to identifiers of users with special roles, such as moderators or important persons,
  information which can be used by the co-presence client to communicate with software components in the Web page,
  information, which indicates, that there should be no virtual presence on the Web page.
  virtual objects (as described in the next section).

This additional information is used to control behavior, appearance and capabilities of avatars.

The important point is that there may be such additional information, which controls the virtual presence on the Web page and, that this information may be transmitted with the mapping rules.

The previous discussion was about user avatars. A co-presence client displays avatars at a screen position relative to the Web browser window, so that the avatars appear to be associated with the Web page. They may be positioned so, that they appear to "stand" on the lower border.

Figure 16:
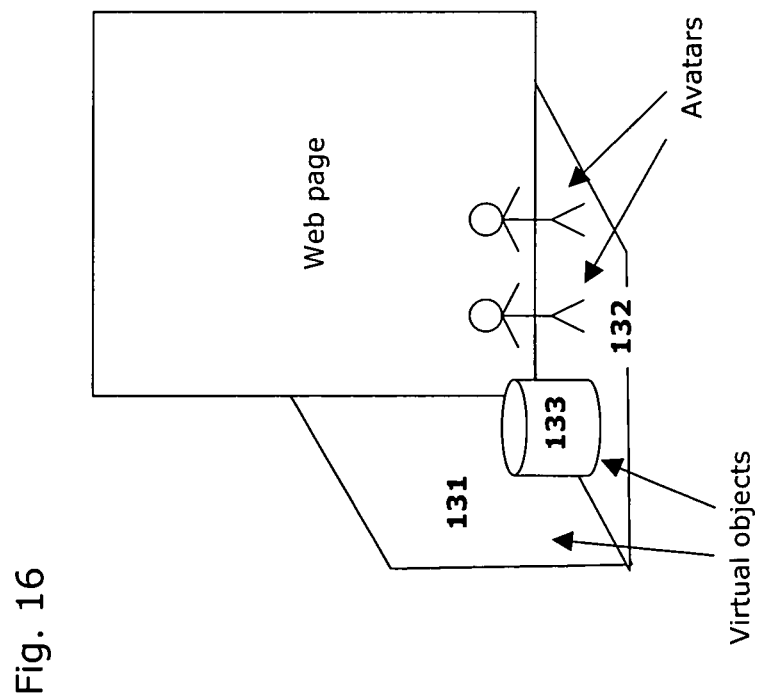
FIG. 16 shows virtual objects and avatars in 3D space
Figure 17:
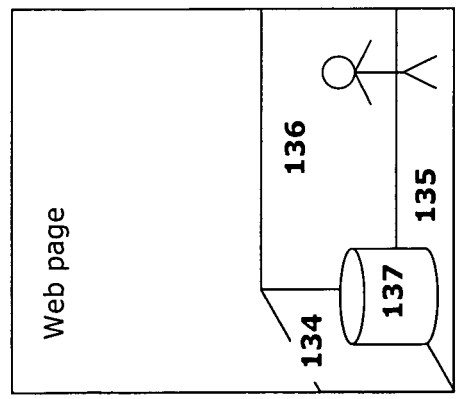
FIG. 17 shows virtual objects and avatars in 3D space

In FIGS. 16 and 17, as an extension of avatars "on" a Web page, avatars and other objects may be positioned on the screen so, that they appear to be in front of the Web browser window. Additional graphical objects may support this impression. There may be a "wall" (131) which virtually emerges from the Web page. There may be a graphical object, which simulates a "floor" (132). There may be additional objects (133).

As an extension of avatars "on" a Web page, avatars and other objects may be positioned on the screen so, that they appear to be in the Web browser window. Additional graphical objects may support this impression. There may be a "wall" (134) which seems to be to the left of virtual objects (137) and avatars. A backside "wall" (136) may visually limit the floor (135). These graphical objects are displayed by the co-presence client, not the Web browser, although they appear to be inside the browser window. They might partially cover graphics of the Web browser window. The virtual walls (134), (136), (135) may be omitted to give way to a background display which simulates an "open space".

The co-presence client displays the graphics, so that it appears to be painted by the Web browser.

Virtual objects can be static or dynamic. Static means that they are configured to be displayed by additional virtual presence information (as described above). Dynamic means, that they appear or change in response to user actions. Static objects may also appear, change, or disappear in response to user actions.

A characteristic difference between avatars and virtual objects is, that avatars represent users, while virtual objects do not.

A user avatar does not necessarily look like a human figure. It may look like a table, but it still represents a user, which makes it an avatar and not a virtual object.

Users can interact directly with virtual objects or indirect by means of their avatar. Directly means, that a user clicks onto a virtual object and commands an action. Indirect means, that the they command the avatar and the avatar stimulates an action.

So called "bots" are a mixture of virtual objects and avatars. Technically they are avatars, but they do not represent users. A bot represents a simulated user. While avatars are controlled by users, bots are controlled by software. They often appear like users. A user can not distinguish at a technical level between another user and a bot, because bots simulate users. Only the interaction may reveal, that the avatar actually is a bot.

The virtual presence scene comprising at least avatars and optionally virtual objects may be used for advertising. For this purpose the co-presence client displays advertising graphics.

Advertising graphics may be attached to avatars or virtual objects. The possible range goes from small tags with symbols and text displayed at the "wall", to advertising objects and advertising avatars, which are configured to show only advertising graphics.

Technically the display of advertising graphics is not different from other graphics. The display process may include data transfer from an advertising server in addition to avatar servers and other data servers.

A so called "ad-bot" is a simulated user as described above, which advertises products by its graphics or behavior including text messages.

Bots may be used for advertising in virtual presence.

Users may undertake a joint Web browsing session, so called co-browsing. This means, that one user is navigating to a Web page and other users follow automatically.

Technically, the co-presence client of the leading user sends the URL to the other users' co-presence clients. It does so either directly or by sending the URL to a co-browsing channel, which forwards the URL to other participating co-presence clients.

A user can interact with an avatar to instruct the co-presence client to join the co-browsing session as the leading user (URL sender).

A user can interact with an avatar to instruct the co-presence client to join the co-browsing session as a follower (URL receiver).

A co-presence client, which joined a co-browsing session and receives a URL may send the URL to the local Web browser in order to instruct the Web browser to navigate to the Web page referenced by the URL.

Figure 18:
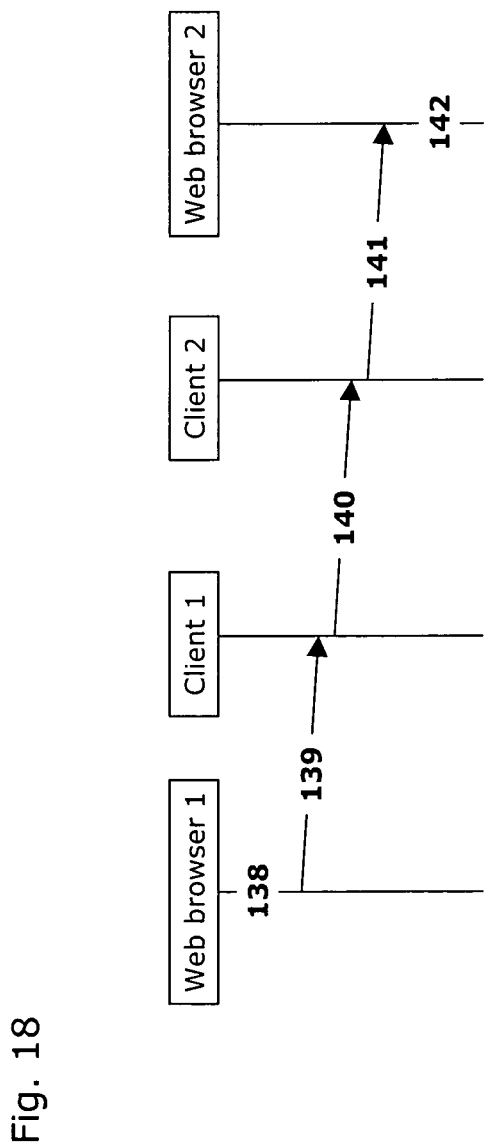
FIG. 18 is a flowchart showing co-browsing

In FIG. 18, user 1 is the leading user of the co-browsing session. User 2 follows user 1, which means, that the Web browser of user 2 will be remote controlled by this mechanism. User 1 navigates (138) to a Web page. The co-browsing component of client 1 receives (139) the URL of the Web page. It sends (140) the URL to the other participants of the co-browsing session, in this case client 2. The co-browsing component of client 2 sends (141) the URL to the Web browser and the Web browser finally navigates (142) to the Web pages referenced by the URL. Effectively, user 2 joins user 1 at the Web page.

The virtual space in front of the Web page, be it 2D (FIG. 4) or 3D (FIG. 16) may be used as a playground where users get and solve tasks as known from online games. In online games tasks and task series are called "quests". This may be a treasure quest, but not necessarily always in search for a treasure. The term is used in a figurative sense. The task might include finding something, but very often it means winning a competition or delivering something.

Tasks may involve actions on multiple Web pages with different virtual spaces. Tasks may be given by users, e.g. moderators through their avatars or by virtual objects or bots. A user can interact with such a "task dispenser" to request a task. The task dispenser may indicate the availability of at least one task by a graphical image. The availability of tasks and thus the indication may be different for each user.

Users may interact with each other by means of their own or the other users' avatars. They may cooperate with each other or they may compete with each other. Users cooperate and compete by instructing their or the other user's co-presence client to execute a function.

The user selects an avatar by clicking on it. A menu with function identifiers may appear. The user selects a function by clicking on the function icon or name. Alternatively, the user may press a key on the keyboard to execute a function.

The function is executed on the first user's computer and on the second user's computer. The function changes the value of at least one internal software variable of the co-presence client software. At least one software variable is used to derive a failure or success decision if it reaches a predefined level. The value(s) of the variable(s) and the decision(s) may be displayed to at least one user graphically.

The value of software variables may be stored by the co-presence client or the co-presence server or another data server. The variables indicate capabilities or achievements. They may accumulate over time.

Based on the value of internal software variables of the co-presence client or the co-presence server or another data server, the co-presence client may change the appearance of avatars.

The number of users at a Web page is a measure for the total number of users who read the page. In other words, the length of the co-presence list in terms of the number of users (avatars) on the Web page is a measure for the popularity of the page.

A popularity index is generated by comparing the number of users on Web pages. The highest number of users results in the highest popularity index value.

By using such a virtual presence generated popularity index, the rating of pages in search engines results can be improved. Search engine results are ordered by the virtual presence generated popularity index. The popularity index may not completely control the order. It may be used to augment the ordering by applying a weight to the original ordering and a weight to the ordering by popularity index, then computing the final ordering taking weights and values into account.

In addition the virtual presence generated index is shown with the search results. Users can then choose search results, based on the popularity index. Effectively, the popularity index displayed with search results shows how many people are already there before the user selects a link to go there. This is an interesting information for users of search engines. They can go where many people already are or they may avoid many people and select sparsely populated Web pages. The information benefits users and is in turn valuable for the search engine operator.

A popularity index is generated for Web sites/pages based on virtual presence information by measuring the number of users who are accessing sites/pages.

A popularity index is used by rating search engine results.

Search engine results are displayed in an order which depends on a rating based on the popularity index.

The popularity index is used to augment the page rank. Web pages with a popularity index get a higher page rank.

The popularity index is displayed with search results.

The popularity index may consist of multiple values which express different sub-sets of users who access a Web page. Example: users might be interested in more detailed information where the total number is split up into individual numbers for groups of different gender or age. So, an individual popularity index is generated for a sub group and this index is displayed to members of the group.

Figure 19:
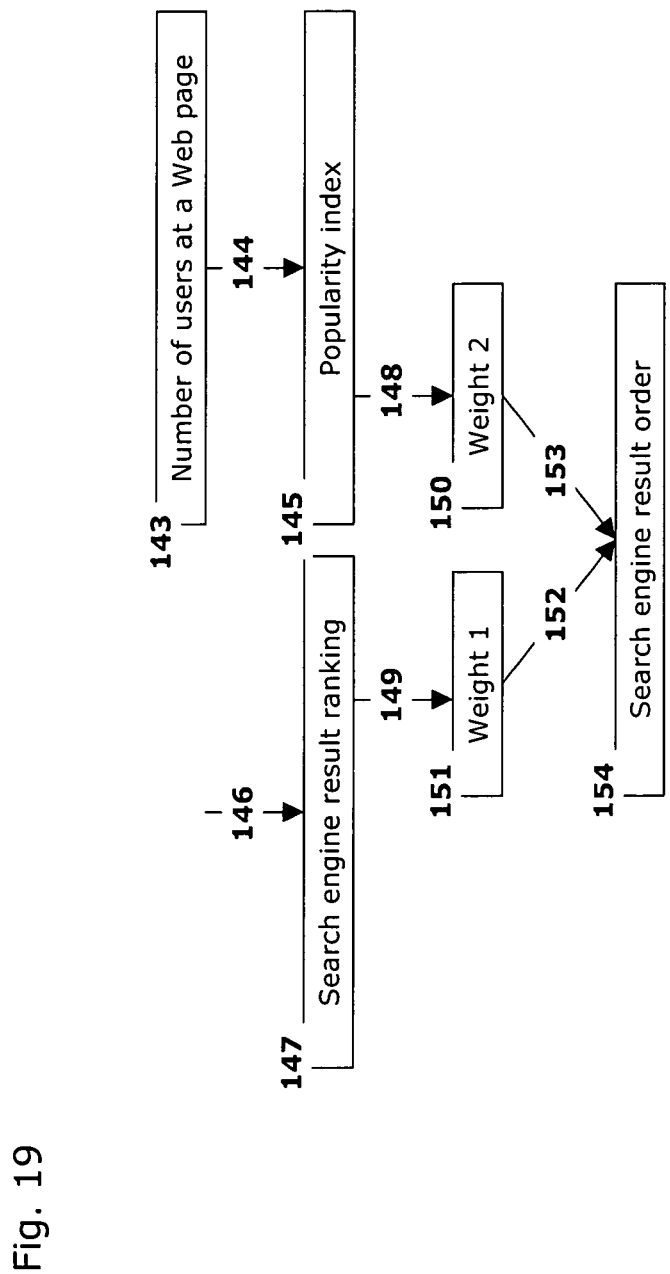
FIG. 19 is a flowchart showing popularity indexing

In FIG. 19, the co-presence system keeps a user count (143) for individual Web pages or groups of Web pages (as defined by the location mapping rules) as part of its normal operation. This (144) count is sent to a software module, which computes a popularity index (145). The index may simply be the original count, but it may also represent a class of possible counter values on a fixed scale. A search engine typically rates (146) Web pages by various means and computes a ranking for the results (147). It depends on the implementation of the search engine. The popularity index (145) and the search engine result (147) are both weighted (148), (149) with individual numerical weights (150), (151) and combined (152), (153) into a final rating (154), which controls the order in a list of results.

Browsing Web pages on mobile phones becomes more common. Since screens of mobile phones become larger, there is space to display graphics, which represents users on Web pages. Avatars of users are shown who read the same Web page or related Web pages (as defined by the location mapping rule) at the same time on the screen of the mobile device.

The mobile device may still be smaller than a usual computer screen. For this reason the screen of the mobile device may display only a single Web page. The avatars may be positioned differently than on a computer screen. While usually associated with the Web browser window, they may also be displayed in a list above, below, right, or left of the Web browser of the mobile device.

The avatars may also be displayed smaller than they are displayed on a usual computer screen. The avatars may be displayed in reduced quality by reducing their size, pixel depth, 3D model complexity, or texture size.

An additional avatar server for mobile devices may provide appropriate avatar data of reduced quality in order to reduce the transmitted data volume. The avatar server for mobile devices may modify the original avatars data and reduce its data volume or it may use custom made avatar data.

A co-presence proxy may be employed to reduce the traffic on the wireless connection. The co-presence proxy implements functions of the co-presence client and it sends data for the avatar display to the mobile device. It is not executed on the mobile device, but on a separate computer which might have a better network connection than the mobile device.

I claim:

1. The image generating method for simultaneous representative visual display of multiple computer users, the image generating method comprising steps of:

visiting a web page in that a first computer user navigates a first web browser on a first computer to said web page such that said web page is shown on a web browser window of said first web browser on said first computer, performing location mapping in that:

a first co-presence manager on said first computer performs a computation using a URL of said web page as an input and such that a co-presence channel name and an address of a co-presence server result, said first co-presence manager using said URL and no input from said web page in said computation, and said first computer then notifies said co-presence server of said visiting of said web page by said first computer user in that said first computer transmits said co-presence channel name to said address of said co-presence server, generating a first image package representative of said first computer user, visiting said web page in that a second computer user navigates a second web browser on a second computer to said web page such that said web page is shown on a web browser window of said second web browser on said second computer, performing location mapping in that:

a second co-presence manager on said second computer performs a computation using a URL of said web page as an input and such that a co-presence channel name and an address of a co-presence server result, said second co-presence manager using said URL and no input from said web page in said computation, and said second computer then notifies said co-presence server of said visiting of said web page by said second computer user in that said second computer transmits said co-presence channel name to said address of said co-presence server, generating a second image package representative of said second computer user, displaying said first image package on said web browser window of said first computer over said web page, and displaying said second image package on said web browser window of said first computer over said web page.

2. The image generating method for simultaneous representative visual display of multiple computer users according to claim 1, wherein said first and second image packages are integrated with said web browser window of said first web browser of said first computer.

3. The image generating method for simultaneous representative visual display of multiple computer users according to claim 1, further comprising the steps of assigning first coordinates to the first image package, and assigning second coordinates to the second image package.

4. The image generating method for simultaneous representative visual display of multiple computer users according to claim 3, further comprising the step of positioning said first image package and said second image package on said web browser window of said first web browser of said first computer utilizing said first and said second coordinates.

5. The image generating method according to claim 1, further comprising steps of:
   establishing said first image package in the form of an avatar,
   establishing avatar graphics data,
   establishing avatar copresence data,
   establishing a transparency mask, the transparency mask defining the shape of said first image package independent of a background,
   establishing a window manager, said window manager identifying the absolute coordinates of said web browser window of said first web browser of said first computer, and
   wherein said first co-presence manager identifies the required components of individual image packages which are to be drawn at coordinates relative to said web browser window, for receiving web browser window information and address information of said web page, and for communicating information about the presence of said first computer user on said web page to said co-presence server,
   establishing a virtual presence service comprising a co-presence service, at least one avatar server, and at least one communication server, the co-presence service comprising said co-presence server, said co-presence server being for creating a co-presence list of users using said web page, for communicating the list to at least one co-presence client, and for acquiring for each user at least one user identifier, at least one avatar data identifier, and an avatar version identifier,
   wherein the method further comprises steps of:
   communicating via the at least one avatar server information describing the appearance and identity of the avatar,
   communicating via the at least one communication server data between users represented as avatars,
   establishing an avatar data container,
   establishing at least one co-presence client for communicating information about the appearance of the avatars, for accumulating sufficient data to render an avatar on a screen position where the avatar appears associated with said web browser window, and for communicating a presence of said avatar to the copresence service, and
   establishing a mapping rule service, mapping rules, regular expressions, and message digests,
   wherein multiple users being represented as avatars are able to interact with awareness of each other together on a single web page.

6. The image generating method according to claim 5, further comprising the step of generating an avatar status tag for at least one avatar.

7. The image generating method according to claim 5, further comprising the step of generating text based chat and communicating the text based chat between users.

8. The image generating method according to claim 5, further comprising the step of utilizing a chat server as said co-presence server.

9. The image generating method according to claim 5, further comprising the step of establishing cached data including avatar information and establishing an invalidation strategy to analyze the cached data and reacquire new avatar data.

10. The image generating method according to claim 5, further comprising the step of transmitting sound between co-presence clients.

11. The image generating method according to claim 5, further comprising the step of generating a popularity index by measuring the number of users who access particular sites.

12. The image generating method according to claim 5, further comprising the step of adapting the avatar to a mobile device display, and employing a co-presence proxy to reduce traffic on a wireless connection.

13. The image generating method according to claim 5, further comprising the step of implementing at least one game avatar on the web page.

14. The image generating method according to claim 5, the avatar data container having at least one component, the component comprising avatar data and/or an identifier referencing another container.

15. The image generating method according to claim 5, wherein the window manager identifies the position size and visibility of the web browser window, and the position of the content of the web browser window.

16. The image generating method according to claim 5, further comprising the step of using a 3D model base to generate avatar graphics.

17. The image generating method according to claim 5, further comprising the step of exporting avatars from other game-like environments into the present system.

18. The image generating method according to claim 5, further comprising the step of utilizing virtual non-avatar objects.

19. The image generating method according to claim 5, further comprising the step of utilizing advertising graphics displayed by avatars, bots, and/or virtual objects.

20. The image generating method according to claim 5, further comprising the step of positioning avatars and/or virtual objects away from the two dimensional web page.

21. The image generating method according to claim 5, further comprising the step of facilitating the cooperation and interaction of avatars, and allowing for the interaction to alter the appearance of the respective avatars.

* * * * *

UNITED STATES PATENT AND TRADEMARK OFFICE
CERTIFICATE OF CORRECTION

PATENT NO. : 8,504,926 B2  
APPLICATION NO. : 12/009082  
DATED : August 6, 2013  
INVENTOR(S) : Wolf Page 1 of 1

It is certified that error appears in the above-identified patent and that said Letters Patent is hereby corrected as shown below:

In the Claims

In Column 22, line 21 (line 1 of Claim 1) please change "The" to correctly read:  --An--.

Signed and Sealed this  
Twenty-fourth Day of December, 2013

Margaret A. Focarino  
*Commissioner for Patents of the United States Patent and Trademark Office*